(12) United States Patent
Wong et al.

(10) Patent No.: US 7,879,143 B2
(45) Date of Patent: *Feb. 1, 2011

(54) POLYALKYLENE MATERIALS

(75) Inventors: Raymond W. Wong, Mississauga (CA); Marcel P. Breton, Mississauga (CA); San-Ming Yang, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1216 days.

This patent is subject to a terminal disclaimer.

(21) Appl. No.: 11/352,715

(22) Filed: Feb. 13, 2006

(65) Prior Publication Data

US 2006/0257773 A1    Nov. 16, 2006

Related U.S. Application Data (63) Continuation-in-part of application No. 11/126,745, filed on May 11, 2005.

(51) Int. Cl.
*C09D 11/12* (2006.01)
*C08F 110/00* (2006.01)
*C08F 110/02* (2006.01)
*C08F 110/04* (2006.01)

(52) U.S. Cl. .................... 106/31.3; 106/31.62; 526/352

(58) Field of Classification Search ........................ None
See application file for complete search history.

(56) References Cited

U.S. PATENT DOCUMENTS

| | | | |
|---|---|---|---|
| 4,298,672 A | 11/1981 | Lu | |
| 4,338,390 A | 7/1982 | Lu | |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 5,734,402 A | 3/1998 | Rousseau et al. | |
| 5,780,528 A | 7/1998 | Titterington et al. | |
| 5,861,903 A | 1/1999 | Crawford et al. | |
| 6,028,138 A * | 2/2000 | Hahn et al. ................. | 524/590 |
| 6,147,937 A | 11/2000 | Arikawa et al. | |
| 6,221,137 B1 | 4/2001 | King et al. | |
| 6,309,453 B1 | 10/2001 | Banning et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,726,755 B2 | 4/2004 | Titterington et al. | |
| 6,860,930 B2 | 3/2005 | Wu et al. | |
| 7,377,971 B2 * | 5/2008 | Wu et al. ................. | 106/31.29 |
| 7,381,254 B2 * | 6/2008 | Wu et al. ................. | 106/31.29 |
| 7,407,539 B2 * | 8/2008 | Wu et al. ................. | 106/31.29 |
| 7,442,242 B2 * | 10/2008 | Wu et al. ................. | 106/31.29 |
| 2005/0113482 A1 | 5/2005 | Wong et al. | |
| 2005/0130054 A1 * | 6/2005 | Yuan et al. ................ | 430/108.8 |

OTHER PUBLICATIONS

"POLYWAX® Polyethylenes", published 2002 by Baker Petrolite, downloaded from http://yinsen.net/file/wax/datasheet/Polywax.pdf, pp. 1-4.*

* cited by examiner

*Primary Examiner*—Eric S Olson
(74) *Attorney, Agent, or Firm*—Fay Sharpe LLP (57) ABSTRACT

The disclosure provides, in various embodiments, a method for fractionating a polyalkylene, and the fractionated polyalkylene produced thereby. The method includes, for example, separating, from a starting polyalkylene, a first portion of a polyalkylene having a Mw less than the Mw of the starting polyalkylene. Also included are carriers, phase change inks and toners comprising the fractionated polyalkylene, such as the first portion of a polyalkylene.

10 Claims, 4 Drawing Sheets

POLYALKYLENE MATERIALS

PRIORITY

The present application is a continuation-in-part of and claims priority under 35 U.S.C. §120 to U.S. Ser. No. 11/126, 745, filed May 11, 2005, the entire disclosure of which is incorporated herein by reference.

CROSS-REFERENCE TO RELATED APPLICATIONS

Attention is directed to commonly-assigned U.S. patent application Ser. No. 11/352,715, filed Feb. 13, 2006, entitled "Polyalkylene Materials"; U.S. patent application Ser. No. 11/273,789, filed Nov. 14, 2005, entitled "Crystalline Wax"; U.S. patent application Ser. No. 11/273,895, filed Nov. 14, 2005, entitled "Crystalline Wax"; U.S. patent application Ser. No. 11/273,748, filed Nov. 14, 2005, entitled "Toner Having Crystalline Wax"; U.S. patent application Ser. No. 11/273, 751, filed Nov. 14, 2005, entitled "Toner Having Crystalline Wax"; and U.S. patent application Ser. No. 11/274,459, filed Nov. 14, 2005, entitled "Toner Having Crystalline Wax". The disclosures of these patent applications are hereby incorporated by reference in their entirety.

BACKGROUND

The present disclosure is generally directed, in various exemplary embodiments, to methods of separating or fractioning polyalkylene materials, such as polyalkylene waxes. The present disclosure also relates to products produced utilizing the separated or fractionated materials, such as phase change inks and toners comprising the same. The resulting products can be selected for known electrophotographic, electrostatographic, xerographic, and like imaging processes, including copying, printing, faxing, scanning, and like machines, and including digital, image-on-image, color, lithography, and like processes.

Polyalkylene waxes are a component used in toners, phase change inks, and other marking materials. Wax properties such as purity, molecular weight distribution, polydispersity, jetting, fusion, etc., are important for the performances of these applications.

For example, polyalkylene waxes, such as polyethylene waxes, having molecular weights Mw less than 1500, preferably less than 1000, are components in mainline high melting and low melting solid inks, respectively. These wax materials have low melting points that allow for low jetting temperatures to be utilized and maintained while also lowering the coefficient of friction.

However, some polyalkylene waxes fail to meet one or more of the desired requirements for waxes. In this regard, wax marking products may exhibit large batch-to-batch variations, high polydispersity indexes (PDI), skewnesses in Mw distribution, etc. These undesired material characteristics create inconsistent results in the marking products.

Some commercially available polyalkylene waxes, such as POLYWAX™ 655 and 500 (Baker-Petrolite Corp.), have wide Mw distributions with carbon chain lengths ranging from about 30 to about 70 carbons (POLYWAX 500) and from about 30 to about 100 carbons (POLYWAX 655). Additionally, these waxes have a high content of low Mw fractions (fractions comprising carbon chain lengths of from about 50 carbons or less). The low Mw fraction in POLYWAX 500 is around 50% by weight, and the low Mw fraction in POLYWAX 655 is around 40% by weight. Low Mw materials lower the onset of wax melting (lower the offset temperature) and also weaken the mechanical strength of the solidified waxes.

Moreover, there are only a limited number of large scale methods available to purify wax material. Distillation is one method typically used to provide fractionated versions of the waxes. For example, some suppliers of the polyalkylene waxes perform distillation processes on the waxes to supply fractionated or semi-fractionated versions and to achieve narrower Mw distributions. These distillation procedures, however, have drawbacks in that they are expensive and generally limited to lower molecular weight materials.

This disclosure is directed to overcoming one or more of the aforementioned problems and/or others.

BRIEF DESCRIPTION

In one exemplary embodiment, a method of fractioning a polyalkylene, such as a polyalkylene wax, is provided. The method comprises providing an initial polyalkylene having a weight average molecular weight Mw; combining the polyalkylene with a fluid, wherein the fluid is selected from a group consisting of a) acyclic branched or unbranched hydrocarbons having the general formula $C_nH_{2n+2}$, in which n is the number of atoms and is, for example, from about 1 to about 30, including from about 5 to about 26, and from about 5 to about 16; and, b) supercritical fluids ("SCF"); and wherein a first portion of the polyalkylene with a weight average molecular weight $Mw_1 < Mw$ becomes dissolved in the fluid; separating from the fluid a second portion of the polyalkylene with a weight average molecular weight $Mw_2 > Mw$ that is insoluble in the fluid; and, recovering the first portion or the second portion of the polyalkylene material from the fluid. Also disclosed is the fractionated polyalkylene produced by this process.

In another exemplary embodiment, a carrier or a phase change ink comprising the fractionated polyalkylene from the above method is provided. These products have a wide variety of uses including, but not limited to, printing, duplicating and/or coating applications.

In still another exemplary embodiment, a polyalkylene wax fraction is provided. The polyalkylene wax fraction is obtained by combining an initial polyalkylene having a weight average molecular weight Mw with a fluid, wherein the fluid is selected from the group consisting of a) acyclic branched or unbranched hydrocarbons having the general formula $C_nH_{2n+2}$, in which n is the number of atoms and is, for example, from about 1 to about 30, including from about 4 to about 26, and from about 5 to about 16; and, b) supercritical fluids, dissolving a first portion of the polyalkylene in the fluid, the first portion having a weight average molecular weight $Mw_1$ that is from about 0.55 Mw to about 0.95 Mw, separating a second portion of the polyalkylene, the second portion being insoluble in the fluid and having a weight average molecular weight $Mw_2$ that is from about 1.05 Mw to about 1.45 Mw, and recovering the first portion, wherein the polyalkylene wax fraction comprises the first portion of the polyalkylene wax.

In still another exemplary embodiment, a phase change ink is provided comprising a colorant; and a polyalkylene wax fraction obtained by extracting the polyalkylene wax fraction from an initial or starting polyalkylene with a fluid; wherein the fluid is selected from the group consisting of hydrocarbons of the formula $C_nH_{2n+2}$ in which n is the number of atoms and is, for example, from about 1 to about 30, including from about 4 to about 26, and from about 5 to about 16 and supercritical fluids, and recovering the polyalkylene wax fraction, the polyalkylene wax fraction having a polydispersity equal to or less than about 1.30, including less than about 1.07, such as 1.05.

In yet another exemplary embodiment, a phase change ink is provided comprising a colorant and a carrier comprising a first polyalkylene wax portion separated from a starting polyalkylene wax having a polydispersity index PDI, the polyalkylene wax portion being separated from the starting polyalkylene wax by (i) combining the starting polyalkylene wax with a fluid comprising acyclic branched or unbranched hydrocarbons having the general formula $C_nH_{2n+2}$, in which n is the number of atoms and is, for example, from about 1 to about 30, including from about 4 to about 26, and from about 5 to about 16, (ii) dissolving the first polyalkylene wax portion in the fluid, and (iii) recovering the first polyalkylene wax portion from the fluid, wherein the first polyalkylene wax portion has a polydispersity index $PDI_1$, and $PDI_1$ is less than PDI.

In still a further exemplary embodiment, a fractionated polyalkylene wax is provided, the fractionated polyalkylene wax being obtained by (i) combining a polyalkylene wax having a weight average molecular weight (Mw) and a polydispersity index PDI with a fluid, wherein the fluid is selected from the group consisting of a) acyclic branched or unbranched hydrocarbons having the general formula $C_nH_{2n+2}$, in which n is the number of atoms and is from about 5 to about 16; and, b) supercritical fluids, (ii) dissolving a first portion of the polyalkylene in the fluid, the first portion having a weight average molecular weight $Mw_1$ that is less than Mw and a polydispersity index $PDI_1$ that is less than PDI, (iii) separating a second portion of the polyalkylene wax, the second portion being insoluble in the fluid and having a weight average molecular weight $Mw_2$ that is greater than Mw, and a $PDI_2$ that is greater than PDI, and (iv) recovering the first portion, wherein the fractionated polyalkylene wax comprises the first portion of the polyalkylene.

In a further exemplary embodiment, a toner comprising the separated or fractionated polyalkylene wax from the above method is provided.

These and other non-limiting features of the exemplary embodiments will be more particularly described with regard to the drawings and detailed description set forth below.

BRIEF DESCRIPTION OF THE DRAWINGS

The following is a brief description of the drawings, which are presented for the purposes of illustrating one or more of the exemplary embodiments disclosed herein and not for the purposes of limiting the same.

DETAILED DESCRIPTION

The disclosure provides, in various embodiments, a method for separating or fractionating a polyalkylene material, and the separated or fractionated polyalkylene material(s) produced thereby. The method generally includes separating low molecular weight polyalkylene fractions from high molecular weight fractions from a starting polyalkylene comprising mixtures of such fractions. For example, a method in accordance with the disclosure includes separating and obtaining, from a starting polyalkylene, a first portion of a polyalkylene having at least one of (i) a Mw less than the Mw of the starting polyalkylene and/or (ii) a polydispersity index less than the polydispersity index of the starting polyalkylene. Also included are ink carriers, phase change inks and toners comprising a portion separated from the starting polyalkylene, such as the first portion of a polyalkylene.

Solvent extraction techniques may be employed in the present separation method of polyalkylene fractions from a wax. "Solvent extraction" in the embodiments includes, for example, the process of transferring a substance from any matrix to an appropriate liquid phase. For example, a starting polyalkylene with a weight average molecular weight Mw (also referred to herein as "the polyalkylene with Mw") in the method may serve as the "any matrix" or "solid phase"; and a hydrocarbon, for example, may serve as the appropriate liquid phase. In the separation process, the first portion of the polyalkylene may be substantially transferred or extracted into the fluid, such as, for example, acyclic branched or unbranched hydrocarbons having the general formula $C_nH_{2n+2}$, in which n is the number of atoms and is, for example, from about 1 to about 30, including from about 4 to about 26, and from about 5 to about 16, while the second portion of the polyalkylene containing high molecular weight fractions can not be substantially extracted or dissolved into the fluid. Sometimes, various leaching techniques may also be employed in the present method.

When a "range" or "group" is mentioned with respect to a particular characteristic of the present disclosure, for example, molecular weight, chemical species, and temperature, it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-ranges or sub-groups encompassed therein; and similarly with respect to any sub-ranges or sub-groups therein.

A starting or initial polyalkylene refers, for example, to a composition comprising hydrocarbon chains such as a polyalkylene. The starting polyalkylene generally is a polyalkylene material such as, for example, a polyalkylene with a weight average molecular weight Mw that has not been subjected to a separation or extraction process in accordance with the present disclosure. A starting polyalkylene may also be referred to herein as a starting polyalkylene wax. Examples of starting polyalkylene waxes include, but are not limited to, polyethylene wax, polypropylene wax, mixture thereof, and any form of ethylene-propylene copolymer wax. In several embodiments of the disclosure, the polyalkylene wax comprises polyethylene wax.

The "polyethylene" used in the disclosure should not be limited to a polymer prepared from ethylene. Polyethylene (PE) waxes may be made from ethylene produced from natural gas or by cracking petroleum naphtha. Ethylene may then be polymerized to produce waxes with various melt points, hardnesses and densities, etc. A polyethylene wax may comprise branched polyethylene, linear polyethylene, or mixture thereof. In typical embodiments, the polyethylene with Mw comprises linear polyethylene.

Commercially available polyalkylene waxes suitable as the starting material include, but are not limited to, polyethylene waxes and functionalized polyethylene waxes such as, for example, those sold under the trade names POLYWAX™ from Baker-Petrolite Corp., AC™ PE wax from Honeywell, LICOWAX™ PE family from Clariant, Synthetic wax from Salsowax, and LUWAX™ from BASF. Some specific examples of suitable wax materials include, but are not limited to, POLYWAX 850, POLYWAX 1000, and POLYWAX 2000.

A starting polyalkylene material is a composition comprising hydrocarbon chains such as polyalkylenes. Other suitable starting polyalkylene include UNILIN™ waxes available from Baker-Petrolite. UNILIN waxes are polyhydroxy compounds that have a broad molecular weight, i.e. from about 300 to about 1500 or more. They are described on Baker-Petrolite's website as long chain primary alcohols composed of approximately 80% primary alcohol and 20% hydrocarbon. An exemplary UNILIN wax is UNILIN 700.

The starting polyalkylene utilized herein has a weight average molecular weight Mw. The value of Mw is not particularly limited. In various embodiment, the value of Mw may broadly range from about 400 to about 15,000. In one embodiment, the starting polyalkylene has a Mw of from about 425 to about 3,000.

Additionally, the starting polyalkylene exhibits a polydispersity index (PDI), which refers to the ratio Mw/Mn, in which Mn is the number average molecular weight of the polymer and Mw is the weight average molecular weight of the polymer. In various embodiments, the PDI of the starting polyalkylene, such as, for example, a polyethylene, with Mw may generally range from that approaching 1 to about 3.0, including from that approaching 1 to about 2.0, and from that approaching 1 to about 1.3.

According to the disclosure, the polyalkylene with Mw may be separated into at least two portions. The first portion polyalkylene has a weight average molecular, $Mw_1$, and is sometimes referred to as "the first portion polyalkylene with $Mw_1$"; the second portion polyalkylene has a weight average molecular, $Mw_2$, and is sometimes referred to herein as "the second portion polyalkylene with $Mw_2$". In typical embodiments, separation of the first portion polyalkylene and the second portion polyalkylene is accomplished based on their solubility difference in a fluid, such as, for example, a hydrocarbon fluid as described herein.

The first portion of a polyalkylene generally comprises low Mw fractions comprising hydrocarbon chains of about 50 carbons and less. The first portion of a polyalkylene also generally exhibits a narrow Mw distribution as indicated by its PDI relative to the starting polyalkylene from which the first portion is separated or fractioned.

In some embodiments, the first portion, comprising a low content of a low Mw fraction (i.e., fractions comprising hydrocarbon chains of about 50 carbons and less) is less than about 30% by volume of the starting polyalkylene. In another embodiment, the low Mw portion of a polyalkylene is less than about 10% by volume of the starting polyalkylene. In still yet another embodiment, the low Mw portion that is less than about 5% by volume of the starting polyalkylene.

The $Mw_1$ value of the first portion is generally less than Mw of the starting polyalkylene. In various embodiments, the $Mw_1$ value of the first portion polyalkylene relative to the starting polyalkylene Mw may generally range from about 0.55 Mw to about 0.95 Mw. In one embodiment, $Mw_1$ is in the range of from about 0.70 Mw to about 0.75 Mw. In a specific embodiment, $Mw_1 \approx 0.73Mw$, such as, for example, where $Mw \approx 2,746$ and $Mw_1 \approx 1,999$.

The second portion contains the larger hydrocarbon chains from the starting polyalkylene. The $Mw_2$ value of the second portion is generally greater than Mw of the starting polyalkylene. In various embodiments, the $Mw_2$ value of the second portion polyethylene relative to the starting polyalkylene may generally range from about 1.05 Mw to about 1.45 Mw. In one embodiment, $Mw_2$ is in the range of from about 1.20 Mw to about 1.30 Mw. In a specific embodiment, $Mw_2 \approx 1.24$ Mw, such as, for example, where Mw 2,746 and $Mw_2 \approx 3,418$.

The first and second polyalkylene portions may exhibit a polydispersity index ($PDI_1$ and $PDI_2$, respectively) that is lower than, equal or about equal to, or greater than PDI of the starting polyalkylene. In one embodiment, the first portion polyalkylene, such as for example a first portion polyalkylene with $Mw_1$, has a polydispersity index $PDI_1$ that is less than PDI (i.e. $PDI_1 < PDI$); and the second portion polyalkylene, such as for example, a second portion polyalkylene, with $Mw_2$ has a polydispersity index $PDI_2$ which is also less than PDI (i.e. $PDI_2 < PDI$). In various embodiments, both $PDI_1$ and $PDI_2$ are in the range of from about 0.78 PDI to about 1.05 PDI. In one embodiment $PDI_1$ is from about 0.90 PDI to about 1.0 PDI. In another embodiment, $PDI_1$ is about 1.30 or less. And in still another embodiment, $PDI_1$ is about 1.04. In one specific embodiment, $PDI \approx 1.45$, $PDI_1 \approx 1.28$, and $PDI_2 \approx 1.27$.

Additionally, in some embodiments, a first portion exhibits a relatively narrow melting characteristic as compared to the starting polyalkylene. As used herein, "melting characteristic" refers to the temperature range over which the melting process occurs for a polyalkylene including, but not limited to a starting polyalkylene wax, a first portion of a polyalkylene, or a second portion of polyalkylene. The melting characteristic of a wax may be analyzed by a DSC trace, as is known in the art. Generally, the melting process for a polyalkylene begins or initiates at a first temperature ($T_1$) and ends at a second temperature ($T_2$). The peak temperature, as evidenced by a DSC trace, is referred to as the melting point. The melting characteristic is the temperature difference between $T_2$ and $T_1$ (i.e., $T_2 - T_1$). In one embodiment, the melting characteristic for a first portion of a polyalkylene is about 50° C. or less. In another embodiment, the melting characteristic for a first portion of a polyalkylene is about 40° C. or less. In still another embodiment, the melting characteristic of a first portion of a polyalkylene is about 40° C.

Additionally, in some embodiments, a first portion exhibits a relatively narrow crystallization characteristic relative to that of the starting polyalkylene. As used herein, "crystallization characteristic" refers to the temperature range over which the crystallization process occurs for a polyalkylene including, but not limited to, a starting polyalkylene wax, a first portion of a polyalkylene, or a second portion of polyalkylene. The crystallization characteristic of a wax may be analyzed by a DSC trace, as is known in the art. Generally, for a polyalkylene, the crystallization process begins or initiates at a first temperature ($T_3$) and ends at a second temperature ($T_4$) wherein $T_4$ is smaller than $T_3$. The peak temperature, as evidenced by a DSC trace, is referred to as the crystallization point. The crystallization characteristic is the temperature difference between $T_3$ and $T_4$ (i.e., $T_3 - T_4$). In one embodiment, the crystallization characteristic for a first portion of a polyalkylene is about 50° C. or less. In another embodiment, the crystallization characteristic for a first portion of a polyalkylene is about 40° C. or less. In still another embodiment, the crystallization characteristic of a first portion of a polyalkylene is about 30° C. or less. Yet, in another embodiment, the second temperature $T_4$ of the fractionated fraction is from about 1° C. to about 20° C. above the temperature $T_4$ of the starting polyalkylene. In some embodiments, the fractionated portion of the polyalkylene has a preferred crystallization temperature $T_4$ that is above 55° C. while the $T_4$ temperature of the starting polyalkylene is below 50° C.

Generally, the method for fractionalizing and obtaining the first or second portion includes providing a starting polyalkylene material having a weight average molecular weight Mw, combining the starting polyalkylene with a fluid, dissolving a first portion of the polyalkylene with a weight average molecular weight $Mw_1<Mw$ in the fluid, separating a second portion of the polyalkylene with a weight average molecular weight $Mw_2$ that is insoluble in the fluid, and optionally recovering the first portion. The method may also include washing the second portion with the fluid to dissolve and extract any first portion polyalkylenes that may not have been dissolved or extracted.

The fluid with which the starting polyalkylene is mixed may be selected from (i) a hydrocarbon having the general formula $C_nH_{2n+2}$ or (ii) a supercritical fluid. In various embodiments, the polyalkylene starting material is mixed with a hydrocarbon fluid selected from acyclic branched or unbranched hydrocarbons having the general formula $C_nH_{2n+2}$, in which n is the number of atoms and is, for example, from about 1 to about 30, including from about 4 to about 26, and from about 5 to about 16. Such hydrocarbons may comprise a normal (n-) alkane, an isomeric (iso-) alkane, or mixtures thereof. In one embodiment, the hydrocarbon fluid may comprise an isomeric alkane. In another embodiment, the hydrocarbon fluid comprises an isomeric alkane having from about 7 to about 10 carbon atoms.

Exemplary hydrocarbons of the formula $C_nH_{2n+2}$ may be selected from one or more of the following compounds or mixture thereof:

A-1

A-2

A-3

A-4

A-5

A-6

A-7

A-8

-continued

A-9

A-10

A-11

A-12

A-13

A-14

A-15

A-16

A-17

A-18

A-19

A-20

A-21

A-22

In a specific embodiment, the hydrocarbon fluid comprises the compound having Formula A-9, which is known as 2,2,4-trimethyl pentane [$CH_3C(CH_3)_2CH_2CH(CH_3)CH_3$] and may be commercially obtained from Exxon-Mobile (Houston, Tex.) under the trade name of ISOPAR™ C.

In various embodiments, the weight ratio between the starting polyalkylene, such as, for example, polyethylene, with Mw and the hydrocarbon fluid may generally range from about 1:2 to about 1:8 typically range from about 1:3 to about 1:5. In a specific embodiment, the weight ratio between the starting polyalkylene, such as, for example, polyethylene, with Mw and the hydrocarbon fluid is in the neighborhood of 1:4.

The dissolving process, also referred to herein as extraction, may be accomplished by mixing the starting polyalkylene with a fluid for a sufficient period of time. In one embodiment, the starting polyalkylene may be mixed with a fluid for a period of time of from about 10 minutes to about 10 hours. In another embodiment, the mixing may take place for a period of from about 1 to about 5 hours. In still another embodiment, a starting polyalkylene is mixed with a fluid for about 3 hours to dissolve or extract the first portion.

In several embodiments employing a hydrocarbon fluid as the solvent, the processes may be conducted at an elevated temperature such as above room temperature. In one embodiment the temperature is in the range of from about 45° C. to about 125° C. In another embodiment, the temperature is in the range of from about 65° C. to about 105° C. In still another embodiment, the temperature is from about 60° C. to about 90° C., including about 85° C. In a further embodiment, the temperature is about 70° C. In exemplary embodiments, the method is known as hot solvent extraction. In a specific embodiment, the method is a hot solvent extraction of POLYWAX 2000 (PW2000) by ISOPAR C at 85° C. In another specific embodiment, the method comprises a hot solvent extraction of POLYWAX 1000 (PW1000) using ISOPAR C at 70° C.

In some embodiments, the first portion of the polyalkylene is recovered from the hydrocarbon fluid solvent. The first portion generally contains low Mw fractions, such as fractions from about 50 carbons or less. A first portion may be recovered by separating the solvent portion, which contains the low Mw fractions, from the second portion of the polyalkylene, such as by decanting, and then cooling the solvent to room temperature to precipitate the first portion of the polyalkylene. The first portion may then be isolated by any suitable method, such as by filtration. Additionally, the second portion may be washed one or more times with the hydrocarbon fluid to further obtain any undissolved or unextracted first portion.

If desired, commonly-known extraction techniques may be used in the method of the disclosure. For example, the method may be conducted with the aid of filter such as vacuum filter, dryer, or combination thereof such as Cogeim filter-dryer; the method may also be conducted with stirring such as 30 RPM; the method may use a sufficiently long operation hour to obtain optimal separation result such as 1-6 hours, for example 3 hours; for a given sample, the method may be repeated as many times as desired, for example, 2-6 times such as 4 times. 4=12 hours; and the raw wax material and the fractionated wax material may be analyzed by DSC and High Temperature GPC (HTGPC).

In other embodiments, a supercritical fluid ("SCF") can be utilized. A supercritical fluid is disclosed here as any substance at a temperature and pressure above its thermodynamic critical point. It has the unique ability to diffuse through solids like a gas, and dissolve materials like a liquid. Additionally, it can readily change in density upon minor changes in temperature or pressure. These properties make it suitable as a substitute for organic solvents in a process called supercritical fluid extraction. Carbon dioxide and water are the most commonly used supercritical fluids. Examples of other supercritical fluids which can be utilized herein include carbon dioxide by itself or in blends with cosolvents such as methanol, ethanol, propane, ethane, etc.

Supercritical fluids can be regarded as "hybrid solvents" with properties between those of gases and liquids, i.e., a solvent with a low viscosity, high diffusion rates and no surface tension. In the case of supercritical carbon dioxide, the viscosity is in the range of from about 0.02 to about 1.0 cP, where liquids have viscosities of approximately from about 0.5 to about 1.0 cP and gases approximately 0.01 cP, respectively. Diffusivities of solutes in supercritical carbon dioxide are up to a factor 10 higher than in liquid solvents. Additionally, these properties are strongly pressure-dependent in the vicinity of the critical point, making supercritical fluids highly tunable solvents. Of the components shown below, carbon dioxide and water are the most frequently used in a wide range of applications, including extractions, dry cleaning and chemical waste disposal. In polymer systems, ethylene and propylene are also widely used, where they act both as a solvent and as the reacting monomer.

| Critical Properties of Various Solvents | | | | |
|---|---|---|---|---|
| SOLVENT | MOLECULAR WEIGHT | TEMPERATURE (K) | PRESSURE (BAR) | DENSITY (G/CM$^3$) |
| Carbon Dioxide | 44.01 | 304.1 | 73.8 | 0.469 |
| Water | 18.02 | 647.3 | 221.2 | 0.348 |
| Methane | 16.04 | 190.4 | 46.0 | 0.162 |
| Ethane | 30.07 | 305.3 | 48.7 | 0.203 |
| Propane | 44.09 | 369.8 | 42.5 | 0.217 |
| Ethylene | 28.05 | 282.4 | 50.4 | 0.215 |
| Propylene | 42.08 | 364.9 | 46.0 | 0.232 |
| Methanol | 32.04 | 512.6 | 80.9 | 0.272 |
| Ethanol | 46.07 | 513.9 | 61.4 | 0.276 |
| Acetone | 58.08 | 508.1 | 47.0 | 0.278 |

References: R. C. Reid, J. M. Prausnitz and B. E. Poling, The properties of gase and liquids, 4$^{th}$ ed., McGraw-Hill, New York, 1987.

Suitable supercritical fluid (SCF) fractionation techniques include, but are not limited to the techniques described by Britto et al. in J. of Polymer Science: Part B: Polymer Physics, Vol. 37, 553-560 (1999) and references therein, the disclosure of which is included herein its entirety by reference. In a first method, an isothermal supercritical fluid fractionation uses supercritical fluids to fractionate polymers into narrow molecular weight distribution fractions. In this technique, pressure is used to vary the solvation power of the supercritical solvent, e.g., propane. The higher the pressure, the higher the solvation power of the solvent. In a second method, the supercritical solvent is used to fractionate the polyalkylene based on crystallinity. This technique is called: "Critical Isobaric Temperature Rising Elution Fractionation."

In typical embodiments, the separation method of this disclosure is scaleable. For example, in a single operation, at least 30 kg, typically at least 40 kg, more typically at least 50 kg of polyalkylene, such as polyethylene, with Mw (e.g., POLYWAX 2000) may be subject to the method.

In exemplary embodiments, the method not only can solve the high temperature tolerance problem, but it also alleviates the batch-to-batch variability exhibited in waxes such as, for example, of POLYWAX from Baker-Petrolite Corp. This batch-to-batch variability has a negative effect on final device performance. The root cause is the variability in the distribution of Mw of POLYWAX. After implementation of the present method, narrowing of the Mw distribution is observed, and this eliminates the wax variability. Also, raw wax material has usually a broader melting characteristic. After the purification process of the method, it is shown that the melting point becomes sharper, which can possibly enhance the toner fusing properties and also the jetting conditions.

In exemplary embodiments, wax materials can be colored through colorants such as pigments, dyes, light reflective or light blocking particles, etc., as it is commonly known in the art. A "colorant" as used herein is any substance that imparts color to another material or mixture. Colorants, such as, for example, dyes or pigments, may either be (1) naturally present in a material, (2) admixed with it mechanically, or (3) applied to it in a solution.

In this regard, a "pigment" is defined herein to include any substance, usually in the form of a dry powder, which imparts color to another substance or mixture. Most pigments are insoluble in organic solvents and water; exceptions are the natural organic pigments, such as chlorophyll, which are generally organosoluble.

Pigments may be classified as follows:
I. Inorganic
  (a) metallic oxides (iron, titanium, zinc, cobalt, chromium).
  (b) metal powder suspensions (gold, aluminum).
  (c) earth colors (siennas, ochers, umbers).
  (d) lead chromates.
  (e) carbon black.
II. Organic
  (a) animal (rhodopsin, melanin).
  (b) vegetable (chlorophyll, xantrophyll, indigo, flavone, carotene).

Some pigments (zinc oxide, carbon black) are also reinforcing agents, but the two terms are not synonymous; in the parlance of the paint and rubber industries these distinctions are not always observed.

"Dyes" include natural and synthetic dyes. A natural dye is an organic colorant obtained from an animal or plant source. Among the best-known are madder, cochineal, logwood, and indigo. The distinction between natural dyes and natural pigments is often arbitrary.

A synthetic dye is an organic colorant derived from coal-tar- and petroleum-based intermediates and applied by a variety of methods to impart bright, permanent colors to textile fibers. Some dyes, call "fugitive," are unstable to sunlight, heat, and acids or bases; others, called "fast," are not. Direct (or substantive) dyes can be used effectively without "assistants"; indirect dyes require either chemical reduction (vat type) or a third substance (mordant), usually a metal salt or tannic acid, to bind the dye to the fiber.

There may be no generally accepted distinction between dyes and pigments. Some have proposed one on the basis of solubility, or of physical form and method of application. Most pigments, so called, are insoluble, inorganic powders, the coloring effect being a result of their dispersion in a solid or liquid medium. Most dyes, on the other hand, are soluble synthetic organic products which are chemically bound to and actually become part of the applied material. Organic dyes are usually brighter and more varied than pigments, but tend to be less stable to heat, sunlight, and chemical effects. The term colorant applies to black and white as well as to actual colors.

In various embodiments, conventional colorant materials may be used, such as Color Index (C.I.) Solvent Dyes, Disperse Dyes, modified Acid and Direct Dyes, Basic Dyes, Sulphur Dyes, Vat Dyes, and the like. Examples of suitable dyes include Neozopon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz): Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol): Dioazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, and uncut Reactant Violet X-80.

Pigments are also suitable colorants for the phase change inks. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111 -S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada): E.D. Toluidine Red (Aldrich): Lithol Rubine Toner (Paul Uhlich): Lithol Scarlet 4440 (BASF); Bon Red C (Dominion Color Company); Royal Brilliant Red RD8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy): Paliogen Blue 6470 (BASF): Sudan III (Red Orange) (Matheson, Colemen Bell); Sudan II (Orange) (Matheson, Colemen Bell); Sudan Orange G (Aldrich). Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991 K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst): Fanal Pink D4830 (BASF): Cinquasia Magenta (DuPont); Paliogen Black L0084 (BASF); Pigment Black K801 (BASF); and carbon blacks such as REGAL 3300 (Cabot), Carbon Black 5250, Carbon Black 5750 (Columbia Chemical), and the like. Also included are black pigments set forth above.

Also suitable as colorants are the isocyanate-derived colored resins disclosed in U.S. Pat. No.5,780,528, the disclosure of which is totally incorporated herein by reference.

Also suitable are the colorants disclosed in U.S. Pat. No. 6,472,523, entitled "Phthalocyanine Compositions"; U.S. Pat. No. 6,726,755 entitled "Ink Compositions Containing Phthalocyanines"; U.S. Pat. No. 6,476,219 entitled "Methods For Preparing Phthalocyanine Compositions"; and, U.S. Pat. No. 6,576,747 entitled "Processes for Preparing Dianthranilate Compounds and Diazopyridone Colorants"; the disclosures of each of which are totally incorporated herein by reference.

Other ink colors besides the subtractive primary colors can be desirable for applications such as postal marking or industrial marking and labeling using phase change printing, and the present development is applicable to these needs. Further, infrared (IR) or ultraviolet (UV) absorbing dyes can also-be incorporated into the inks of the present disclosure for use in applications such as "invisible" coding or marking of products.

Other examples of suitable colorants (i.e., pigments, dyes, etc.) include, but are not limited to, magenta pigments such as 2,9-dimethyl-substituted quinacridone and anthraquinone dye, identified in the color index as C1 60710, C1 Dispersed Red 15, a diazo dye identified in the color index as C1 26050, C1 Solvent Red 19, and the like; cyan pigments including copper tetra-4-(octadecylsulfonamido) phthalocyanine, copper phthalocyanine pigment, listed in the color index as C1 74160, Pigment Blue, and Anthradanthrene Blue, identified in the color index as C1 69810, Special Blue X-2137, and the like; yellow pigments including diarylide yellow 3,3-dichlorobenzidine acetoacetanilides, a monoazo pigment identified in the color index as C1 12700, C1 Solvent Yellow 16, a nitrophenyl amine sulfonamide identified in the color index as Foron Yellow SE/GLN, C1 Dispersed Yellow 33, 2,5-dimethoxy acetoacetanilide, Permanent Yellow FGL, and the like.

Examples of black pigments include carbon black products from Cabot corporation, such as Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls 520, Black Pearls 490, Black Pearls 480, Black Pearls 470, Black Pearls 460, Black Pearls 450, Black Pearls 430, Black Pearls 420, Black Pearls 410, Black Pearls 280, Black Pearls 170, Black Pearls 160, Black Pearls 130, Black Pearls 120, Black Pearls L; Vulcan XC72, Vulcan PA90, Vulcan 9A32, Regal 660, Regal 400, Regal 330, Regal 350, Regal 250, Regal 991, Elftex pellets 115, Mogul L. Carbon black products from Degussa-Huls such as FW1, Nipex 150, Printex 95, SB4, SB5, SB100, SB250, SB350, SB550; Carbon black products from Columbian such as Raven 5750; Carbon black products from Mitsubishi Chemical such as #25, #25B, #44, and MA-100-S can also be utilized.

Moreover, one or more dispersing aids, such as surface active agents and dispersants aids like Aerosol™ OT-100 (from American Cynamid Co. of Wayne, N.J.) and aluminum octoate (Witco) and OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like (from Chevron of Houston Tex.). Dispersant aids such as X-5175 (from Baker-Petrolite Corp.), Unithox™ 480 (from Baker-Petrolite Corp.), Polyox™ N80 (Dow), and Ceramer™ 5750 (Baker-Petrolite Corp.) can further be added to the waxy base material. Other dispersing aids such as Ceridust 5551, Ceridust 32451, Ceridust 3910 from Clariant Corp. can also be included.

The present disclosure is also directed to carriers and phase change inks thereof. In one embodiment, a carrier comprises a first portion of a polyalkylene obtained by a method in accordance with the present disclosure. In another embodiment, a carrier comprises a second portion of a polyalkylene obtained via a method in accordance with the present disclosure.

A carrier according to this disclosure is typically a composition comprising a fractionated polyalkylene wax. In one embodiment, a phase change ink comprises a first portion of a polyalkylene. In another embodiment, a carrier comprises a blend of a fractionated polyalkylene and a starting polyalkylene. In still another embodiment, a carrier comprises a first portion of a polyalkylene and a starting polyalkylene. The starting polyalkylene in blends of fractionated polyalkylene and starting polyalkylene may be the same type or a different type of starting polyalkylene from which the fractionated polyalkylene was obtained. Additionally, in still other embodiments, a carrier may comprise a blend of a fractionated polyalkylene, such as a first portion obtained by a method described herein, with other materials suitable to form a carrier.

A carrier composition may comprise from about 1 to about 100% by weight of a fractionated polyalkylene. In one embodiment, a carrier comprises from about 1 to about 80% by weight of a fractionated polyalkylene. In various embodiments, the fractionated polyalkylene employed in the carrier is a first portion of a polyalkylene obtained by a method disclosed herein.

Examples of other suitable carrier materials include fatty amides, such as monoamides, mono-, di-, tri-, and tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula as shown below.

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker-Petrolite, Tulsa, Okla., and can also be prepared as described in Example 1 of U.S. Pat. No. 6,174,937, the disclosure of which is totally incorporated herein by reference. The ink carrier may contain a branched triamide such as those described in U.S. Pat. No. 6,860,930, the disclosure of which is totally incorporated herein by reference. In one specific embodiment, the ink may contain the triamide as described in Example II of U.S. Pat. No. 6,860,930.

Yet other suitable carrier materials are isocyanate-derived resins and waxes, such as urethane isocyanate-derived materials, urea isocyanate-derived materials, urethane/urea isocyanate-derived materials, mixtures thereof, and the like.

Additional suitable carrier materials include a urethane resin that was the adduct of three equivalents of stearyl isocyanate and a glycerol-based alcohol, prepared as described in U.S. Pat. No. 6,309,453, the disclosure of which is totally incorporated herein by reference.

Additional suitable carrier materials include ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof.

Other suitable carrier materials include a blend of alcohol waxes such as a blend of mono- di-, tri- or tetra- alcohol waxes. The relative proportions of each of the alcohol waxes can be provided so as to maintain a predetermined hydroxyl number for the ink carrier.

The hydroxyl number (ASTM E-222-00 mod.) of the ink carrier is in one embodiment of at least about 20, in another embodiment of at least about 25, and in yet another embodiment of at least about 35, and in one embodiment of equal to or less than about 100, in another embodiment equal to or less than about 80, and in yet another embodiment equal to or less than about 50, although the hydroxyl number can be outside of these ranges. The alcohol wax(es) in one embodiment can have a melting point of at least about 50° C., in another embodiment of at least about 60° C., and in a further embodiment of at least about 70° C., in one embodiment equal to or less than about 110° C., in another embodiment equal to or less than about 105° C., and in a further embodiment equal to or less than about 100° C., although the melting point can be outside of these ranges.

A carrier composition comprising a fractionated polyalkylene obtained by a method described herein may be employed in inks, such as, for example, phase change inks. Phase change inks are alternatively known as solid ink or hot melt ink. In various embodiments, a phase change ink contains a colorant and a carrier comprising a fractionated polyalkylene wax, such as a first or second portion of a polyalkylene as described above.

Any desired or effective colorant may be employed in the phase change inks of the present disclosure, including dyes, pigments, mixtures thereof, and the like, provided that the colorant can be dissolved or dispersed in the phase change ink carrier. Suitable colorants include those previously described herein with respect to coloring the polymer or wax used. In various embodiments, a carrier comprising a fractionated polyalkylene wax in accordance with this disclosure, such as a first portion of a polyalkylene, may be combined with one or more of compatible subtractive primary colorants. The subtractive primary colored phase change inks may comprise four component dyes, namely, cyan, magenta, yellow and black, although the inks are not limited to these four colors. These subtractive primary colored inks can be formed by using a single dye or a mixture of dyes.

The colorant is present in the phase change ink of the present disclosure in any desired or effective amount to obtain the desired color or hue, in one embodiment at least about 0.1 percent by weight of the ink, in another embodiment at least about 0.5 percent by weight of the ink, and in yet another embodiment at least about 2 percent by weight of the ink, and in one embodiment no more than about 15 percent by weight of the ink, in another embodiment no more than about 10 percent by weight of the ink, in yet another embodiment no more than about 8 percent by weight of the ink, and in still another embodiment no more than about 6 percent by weight of the ink, although the amount can be outside of these ranges.

A carrier composition comprising a fractionated polyalkylene, such as a first portion polyalkylene, may be present in a phase change ink in any desired or effective amount, in one embodiment of at least about 30 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges. A phase change ink may comprise a fractionated polyalkylene in an amount of from about 1% to about 80% by weight of the ink. In some embodiments, a phase change ink comprises a polyalkylene in an amount of from about 30% to about 65% by weight of the ink. The polyalkylene content of a phase change ink may comprise from about 1% to about 100% of a fractionated polyalkylene, such as, for example, a first portion of a polyalkylene. In some embodiments, the polyalkylene content may be based on the type of colorant employed in the ink composition. In one embodiment, the colorant in an ink is black, and the ink comprises from about 30% to about 60% of a polyalkylene, including a fractionated polyalkylene. In another embodiment, a phase change ink comprises a colorant other than black, and includes a polyalkylene, including a fractionated polyalkylene, in an amount of from about 35% to about 60% by weight of the ink.

The ink is designed for use in either a direct printing mode or an indirect or offset printing transfer system. In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

The phase change inks of the present disclosure can also optionally contain an antioxidant. The optional antioxidants protect the images from oxidation and also protect the ink components from oxidation during the heating portion of the ink preparation process. Specific examples of suitable antioxidants include NAUGUARD® 524, NAUGUARD® 76, and NAUGUARD® 512, NAUGUARD® 455 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

In one specific embodiment, the phase change ink carrier comprises (a) the fractionated polyalkylene wax such as polyethylene wax, e.g. fractionated POLYWAX 500, POLYWAX 650, POLYWAX 1000 and/or POLYWAX 2000, VYBAR 103 and 253 commercially available from Baker-Petrolite Corp., as described above, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearamide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a long chain hydrocarbon having greater than thirty six carbon atoms and having a terminal carboxylic acid group, present in the ink in an amount in one embodiment of at least about 10 percent by weight of the ink in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges (d) a urethane resin derived from the reaction of two equivalents of hydroabietyl alcohol and one equivalent of isophorone diisocyanate, present in the, ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based propoxylate alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The phase change inks of the present disclosure can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink; in another embodiment of at least about 1 percent by weight of the ink, and in yet another embodiment of at least about 10 percent by weight of the ink, and in one embodiment of no more than about 99 percent by, weight of the ink, in another embodiment of no more than about 30 percent by weight of the ink, and in yet another embodiment of no more than about 15 percent by weight of the ink, although the amount can be outside of these ranges.

Other optional additives to the phase change inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about.98 percent by weight of the ink, in another embodiment of no more than about 50 percent by weight of the ink, and in yet another embodiment of no more than about 10 percent by weight of the ink, although the amount can be outside of these ranges; tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified, synthetic polyterpene resin (commercially available from, Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range; adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges; plasticizers, such as UNIPLEX® 250 (commercially available from Uniplex) the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®), a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges; and the like.

A phase change ink in accordance with the present disclosure may, in one embodiment, have a melting point of from about 50° C. to about 160° C. In another embodiment a phase change ink has a melting point from about 70° C. to about 140° C. And in yet another embodiment the melting point is from about 80° C. to about 100° C.

The phase change inks may generally have melt viscosities at the jetting temperature, of from about 2 to 30 centipoise. In another embodiment, the melt viscosity is from about 5 to about 20 centipoise. In yet another embodiment, the melt viscosity is from about 7 to about 15 centipoise. In still another embodiment the melt viscosity is from about 2 centipoise to about 5 centipoise. The melt viscosity, however, can be outside of these ranges. The jetting temperature may be from about 75 to about 180° C., although temperatures outside these ranges are possible.

A phase change ink of the present disclosure can be prepared by any desired or suitable method. For example, the ink ingredients can be mixed together, followed by heating, to a temperature in one embodiment of from about 100° C. to about 140° C., although the temperature can be outside of these ranges, and stirring until a homogeneous ink composition is obtained, followed by cooling the ink to ambient temperature (typically from about 20 to about 25° C.). The inks of the present development are solid at ambient temperature. In a specific embodiment, during the formation process, the inks in their molten state are poured into molds and then allowed to cool and solidify to form ink sticks.

A number of suitable methods are available for preparing the phase change ink composition such as the one described in U.S. Patent Application 20050113482, and in U.S. patent application Ser. No. 11/197,600, filed Aug. 4, 2005, the disclosure of which are totally incorporated herein by reference.

A phase change ink of the present development can be employed in apparatus for direct printing ink jet processes and in indirect (offset) printing ink jet applications. Another embodiment is directed to a process which comprises incorporating an ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present development is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present development can also be employed in other hot melt printing processes, such as hot melt acoustic ink jet printing, hot melt thermal ink jet printing, hot melt continuous stream or deflection ink jet printing, and the like. Phase change inks of the present development can also be used in printing processes other than hot melt ink jet printing processes.

Phase change ink printers conventionally receive ink in a solid form and convert the ink to a liquid form for jetting onto a receiving medium. The printer receives the solid ink either as pellets or as ink sticks in a feed channel. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Any suitable substrate or recording sheet can be employed, including plain papers such as XEROX™ 4024 papers, XEROX™ Image Series papers, Courtland 4024 DP paper, ruled notebook paper, bond paper, silica coated papers such as Sharp Company silica coated paper, JuJo paper, HAMMERMILL LASERPRINT™ paper, and the like, previously imaged substrates, transparency materials, fabrics, textile products, plastics, polymeric films, inorganic substrates such as metals and wood, and the like.

The disclosure further provides a toner formulation comprising a resin, a colorant, and a wax comprising a fractionated polyalkylene wax in accordance this disclosure such as, for example, a first portion of a polyalkylene. Optionally, the toner formulation comprises a resin, a colorant, a wax, a silica, and a charge enhancing additive or charge control additive, a surfactant, an emulsifier, a flow additive, and the mixture thereof.

The resin in the toner formulation may be prepared from any suitable monomers. Exemplary monomers include, but are not limited to, styrene, alkyl acrylate such as methyl acrylate, ethyl acrylate, butyl acrylate, isobutyl acrylate, dodecyl acrylate, n-octyl acrylate, 2-chloroethyl acrylate; β-carboxy ethyl acrylate (β-CEA), phenyl acrylate, methyl alphachloroacrylate, methyl methacrylate, ethyl methacrylate, butyl methacrylate, butadiene, isoprene; methacrylonitrile, acrylonitrile; vinyl ethers such as vinyl methyl ether, vinyl isobutyl ether, vinyl ethyl ether and the like; vinyl esters such as vinyl acetate, vinyl propionate, vinyl benzoate, vinyl butyrate; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidine and the like; methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, and the like, and the mixture thereof.

In typical embodiments, the latex in the toner formulation is a copolymer of two or more monomers. Illustrative examples of such latex copolymers include poly(styrene-n-butyl acrylate-β-CEA), poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate),. poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), poly(styrene-butyl acrylate-acrylonitrile), and the like.

Based on the total toner weight, the latex may generally be present in an amount from about 70% to about 90%, including from about 75% to about 90%, although it may be present in greater or lesser amounts.

Based on the total toner weight, the colorant or colorant mixture may generally be present in an amount from about 0.5% to about 30%, including from about 1% to about 10%, although it may be present in greater or lesser amounts.

The coagulant in the toner formulation may be any coagulant suitable for toner applications. Examples of coagulants include polyaluminum halides such as polyaluminum chloride (PAC), or the corresponding bromide, fluoride, or iodide, polyaluminum silicates such as polyaluminum sulfo silicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate and the like.

A very typical coagulant is PAC which is commercially available, and can be prepared by the controlled hydrolysis of aluminum chloride with sodium hydroxide. Generally, the PAC can be prepared by the addition of two moles of a base to one mole of aluminum chloride. The species is soluble and stable when dissolved and stored under acidic conditions if the pH is less than 5. The species in solution is believed to be of the formula Al13O4(OH)24 (H2O)12 with 7 positive electrical charges per unit.

Based on the total toner weight, the coagulant or coagulant mixture may generally be present in an amount from about 1% to about 10%, although it may be present in greater or lesser amounts.

The wax dispersion in the toner formulation comprises a fractionated polyalkylene wax in accordance with this disclosure. In various embodiments, the wax dispersion comprises a first portion of a polyalkylene wax. Optionally, other waxes suitable for toner applications may be combined with the fractionated polyalkylene wax of this disclosure. Various examples of other suitable waxes include, but are not limited to, Fischer-Tropsch wax (by coal gasification); vegetable waxes such as carnauba wax, Japan wax, Bayberry wax, rice wax, sugar cane wax, candelilla wax, tallow, and jojoba oil; animal wax such as beeswax, Shellac wax, Spermaceti wax, whale wax, Chinese wax, and lanolin; ester wax; saturated fatty acid amides wax such as capronamide, caprylamide, pelargonic amide, capric amide, laurylamide, tridecanoic amide, myristylamide, stearamide, behenic amide, and ethylene-bisstearamide; unsaturated fatty acid amides wax such as caproleic amide, myristoleic amide, oleamide, elaidic amide, linoleic amide, erucamide, ricinoleic amide, and linolenic amide; mineral waxes such as montan wax, ozokerite, ceresin, and lignite wax; synthetic waxes such as polytetrafluoroethylene wax, Akura wax, and distearyl ketone; hydrogenated waxes such as castor wax and opal wax; and modified waxes such as montan wax derivatives, paraffin wax derivatives, and microcrystalline wax derivatives, and combinations thereof.

Based on the total toner weight, the wax or wax mixture comprising a fractionated polyalkylene wax of this disclosure may generally be present in an amount from about 3% to about 20%, although it may be present in greater or lesser amounts.

As an important additive to the toner particles, the silica imparts several advantageous properties to the toner, including, for example, toner flow, tribo enhancement, admix control, improved development and transfer stability and higher toner blocking temperature. For example, silica may improve and control the toner flow properties of the toner. Toner cohesivity can have detrimental effects on toner handling and dispensing. Toners with excessively high cohesion can exhibit "bridging" which prevents fresh toner from being added to the developer mixing system. Conversely, toners with very low cohesion can result in difficulty in controlling toner dispense rates and toner concentration, and can result in excessive dirt in the machine. In addition, in certain applications, toner particles are first developed from a magnetic brush to donor rolls. Toner flow must be such that the electric development fields are sufficient to overcome the toner adhesion to the donor rolls and enable adequate image development to the photoreceptor. Following development to the photoreceptor, the toner particles must also be able to be transferred from the photoreceptor to the substrate.

Silica, in the embodiments, can be added as a surface additive. Suitable silica may be colloidal silica particles, i.e., silica particles having a volume average particle size, for example as measured by any suitable technique such as by using a Coulter Counter, of from about 5 nm to about 200 nm in an aqueous colloidal dispersion. The colloidal silica may contain, for example, about 2% to about 30% solids, and generally from about 2% to about 20% solids.

In an exemplary embodiment, the colloidal silica particles may have a bimodal average particle size distribution. Specifically, the colloidal silica particles comprise a first population of colloidal silica particles having a volume average particle size of from about 5 to about 200 nm, and generally from about 5 nm to about 100 nm, and a second population of colloidal silica particles having a volume average particle size of about 5 to about 200 nm, and generally about 5 to about 100 nm, although the particle size can be outside of these ranges. The first group of colloidal silica particles may comprise, e.g., SNOWTEX OS supplied by Nissan Chemical Industries (about 8 nm), while the second group of colloidal silica particles may comprise, e.g., SNOWTEX OL supplied by Nissan Chemical Industries (about 40 nm).

It is believed that the smaller sized colloidal silica particles are beneficial for toner gloss, while the larger sized colloidal silica particles are beneficial for toner release properties. Therefore the toner release properties and the toner gloss may be controlled by varying the ratio of differently sized colloidal silica particles.

Based on the total toner weight, silica may generally be present in an amount from about 0% to about 20%, including from about 3% to about 15%, and from about 4% to about 10%, although it may be present outside the ranges. In case the silica contains a first group of colloidal silica and a second group of colloidal silica, the first group of colloidal silica particles are present in an amount of from about 0% to about 15%, and generally about 0% to about 10%, of the total amount of silica; and the second group of colloidal silica particles are present in an amount of from about 0% to about 15%, and generally about 0.0% to about 10%, of the total amount of silica.

Various known suitable and effective positive/negative charge enhancing additives can be selected for incorporation into the toner formulation. Examples include quaternary ammonium compounds inclusive of alkyl pyridinium halides; alkyl pyridinium compounds, reference U.S. Pat. No. 4,298,672, the disclosure of which is totally incorporated herein by reference; organic sulfate and sulfonate compositions, U.S. Pat. No. 4,338,390, the disclosure of which is totally incorporated herein by reference; cetyl pyridinium tetrafluoroborates; distearyl dimethyl ammonium methyl sulfate; aluminum salts such as BONTRON E84 or E88 (Hodogaya Chemical); and the like.

Based on the total toner weight, charge enhancing additive may generally be present in an amount from about 0% to about 10%, including from about 1 % to about 8%, and from about 2% to about 5%, although it may be present outside the ranges.

In exemplary embodiments, the toner may be prepared by known aggregation processes, such as by the following procedure:

(i) mixing a first portion of a latex with a colorant dispersion, a wax dispersion comprising the fractionated polyalkylene wax of this disclosure such as fractionated POLYWAX 1000 and/or POLYWAX 2000, and a coagulant, thereby forming a toner slurry;

(ii) heating the toner slurry at or below the glass transition temperature of the latex polymer to form toner sized aggregates;

(iii) adding a second portion of the latex into the toner sized aggregates;

(iv) adjusting the pH of the emulsion system with a base from a pH of about 2 to about 2.5, to a pH of about 6.5 to about 7 to prevent, or minimize additional particle growth;

(v) heating the toner sized aggregates at a coalescence temperature which is above the glass transition temperature of the latex polymer, thereby coalescing the toner sized aggregates into toner particles;

(vi) optionally treating the toner particles with acidic solutions; and (vii) optionally isolating, washing, and drying the toner particle.

The resultant product of the toner process can be pulverized by known methods such as milling to form toner particles. The toner particles generally have an average volume particle diameter of about 2 microns to about 25 microns, typically about 3 microns to about 15 microns.

Toners of the disclosure can be used in known electrostatographic imaging methods. Thus, for example, the toners can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

Specific embodiments of the disclosure will now be described in detail. These examples are intended to be illustrative, and the disclosure is not limited to the materials, conditions, or process parameters set forth in these embodiments. All parts and percentages are by weight unless otherwise indicated.

EXAMPLES

Example 1

Fractionalization Process

150-Gallon POLYWAX 2000 Extraction Process 50 kg POLYWAX 2000 (Baker-Petrolite Corp.), see Table 1, and 292 kg ISOPAR/Ashpar C (Ashland) were charged into a 150-gallon Cogeim filter-dryer that was fitted with a 0.5 µm Gortex filter cloth. Mixing was started at 30 RPM, the filter-dryer was heated to 85° C., and the slurry was mixed for three hours at 85° C. The ASHPAR C was filtered off by vacuum, leaving a POLYWAX 2000 wet cake on the filter cloth. 292 kg fresh Ashpar C was charged into the filter-dryer, and the POLYWAX 2000 wet cake was reslurried by mixing at 30 RPM. The filter-dryer was again heated to 85° C., the slurry was mixed for three hours at 85° C., and the Ashpar C was filtered off by vacuum. The preceding was repeated two more times, for a total of four mixing/filtering steps. The remaining POLYWAX 2000 wet cake was dried at 85° C. for 18 hours in the filter-dryer, and then discharged as a fine white powder. The powder was comilled through a 60-mesh screen to remove lumps. The final product from this procedure will hereafter be referred to as "fractionated POLYWAX 2000".

POLYWAX 1000 Extraction Process 20 grams of powdered POLYWAX 1000 was suspended in 160 ml of ISOPAR C. The suspension was heated up to 70° C. with magnetic stirring for one hour and settled inside a 70° C. oven for another hour. The clear supernatant solvent was decanted as much as possible. Upon cooling the solvent to room temperature, a white powder was precipitated and isolated by filtration. The isolated solid was dried in a vacuum oven at 50° C. overnight (about 14 to about 18 hours) to remove the absorbed ISOPAR C. 1.88 grams (9.4 %) was recovered.

Example 2

DSC Characterization

Figure 1:
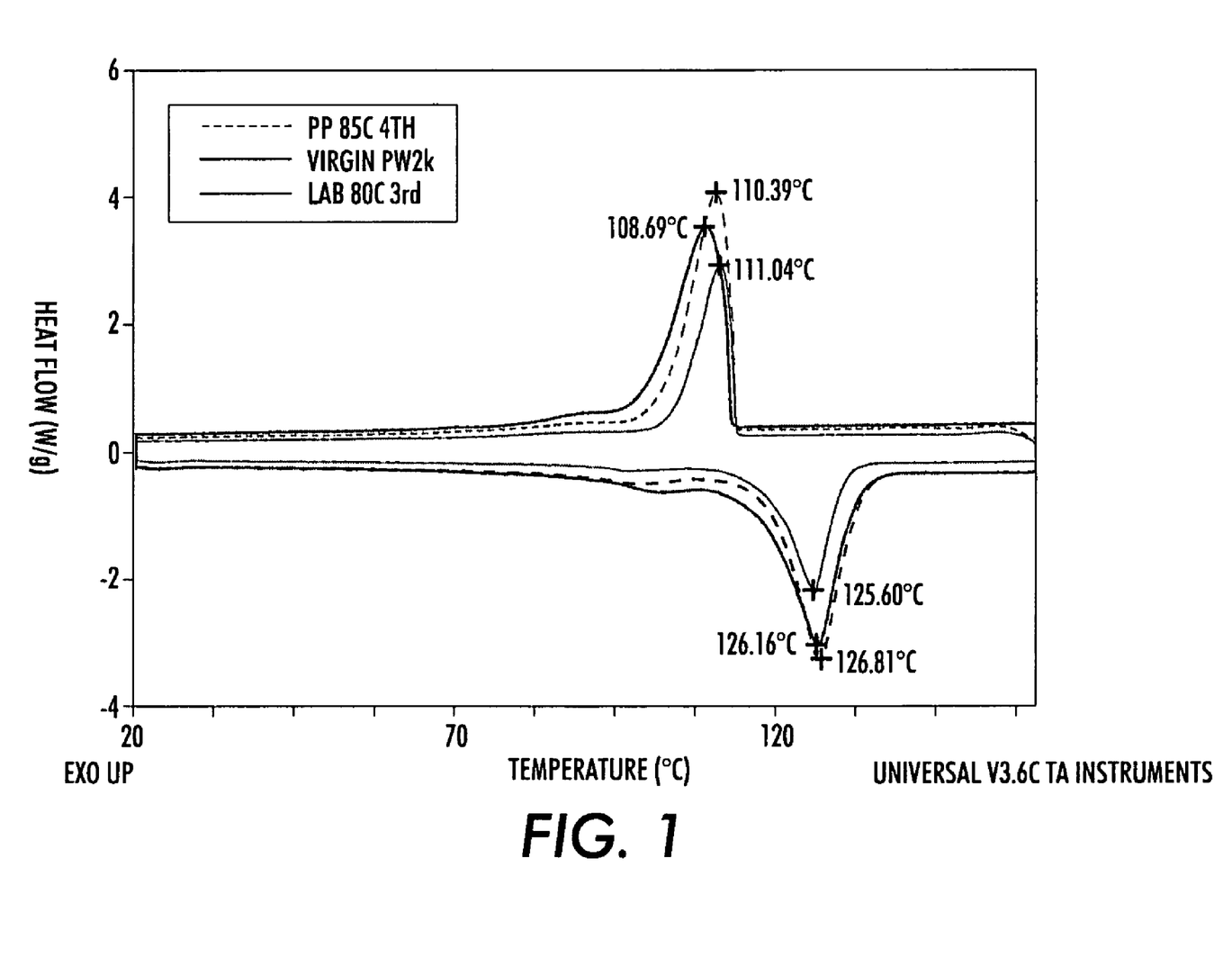
FIG. 1 shows the DSC Analysis of separated polyalkylene samples according to one embodiment of the present disclosure.

Three different samples are tested by DSC: virgin PW2000, pilot plant fractionated PW2000 and bench-scale PW2000. The DSC traces are shown below in FIG. 1. The virgin PW2000 exhibits a broad endothermic event from 90-110° C., which is higher than both fractionated samples. In addition, the pilot plant sample (pp) shows a more silent feature than the bench scale (lab) sample. Therefore, the pilot plant sample is more pure than bench scale one.

Figure 3:
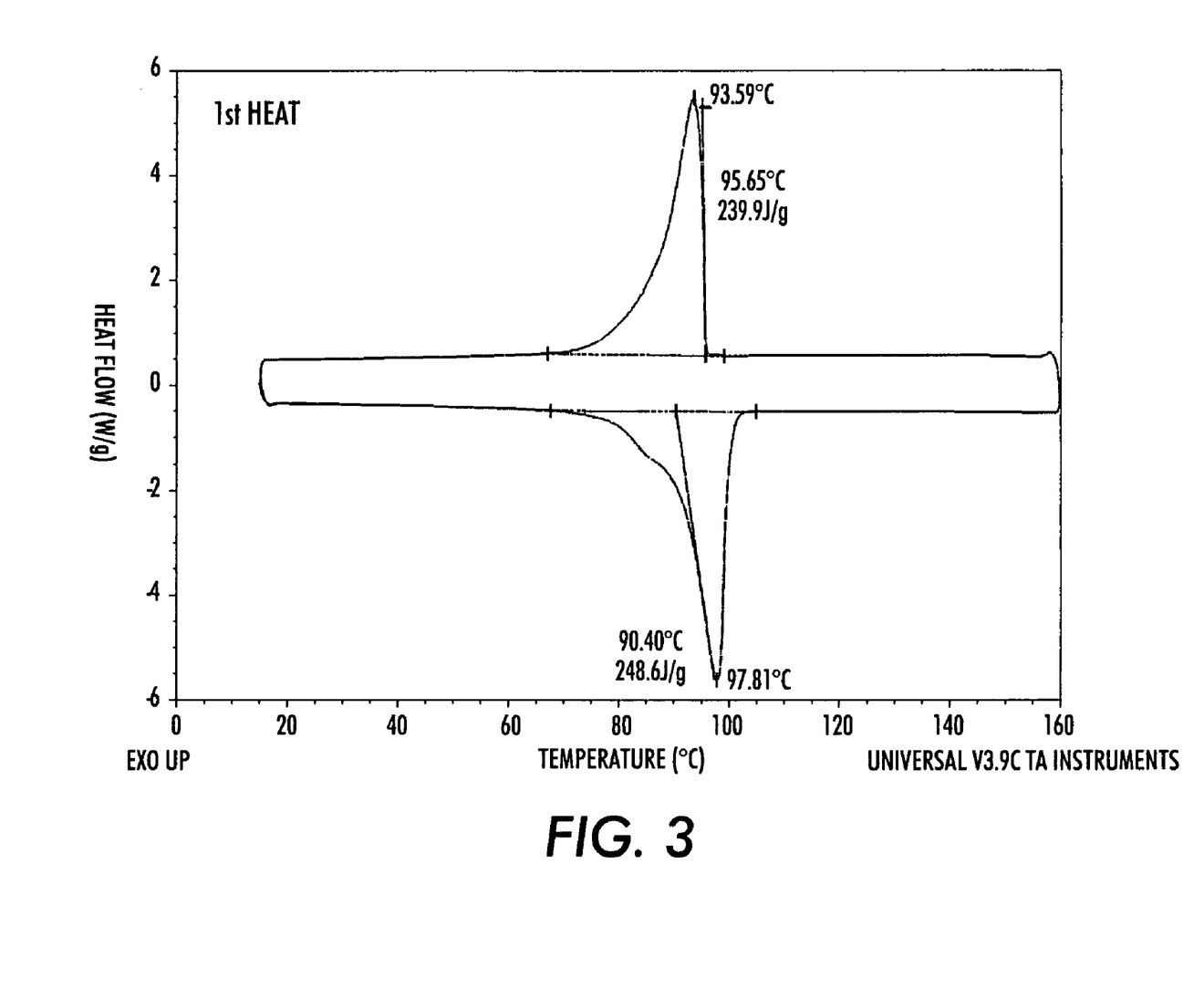
FIG. 3 shows a DSC Analysis of a first portion extracted from a polyalkylene wax according to one embodiment of the present disclosure.
Figure 4:
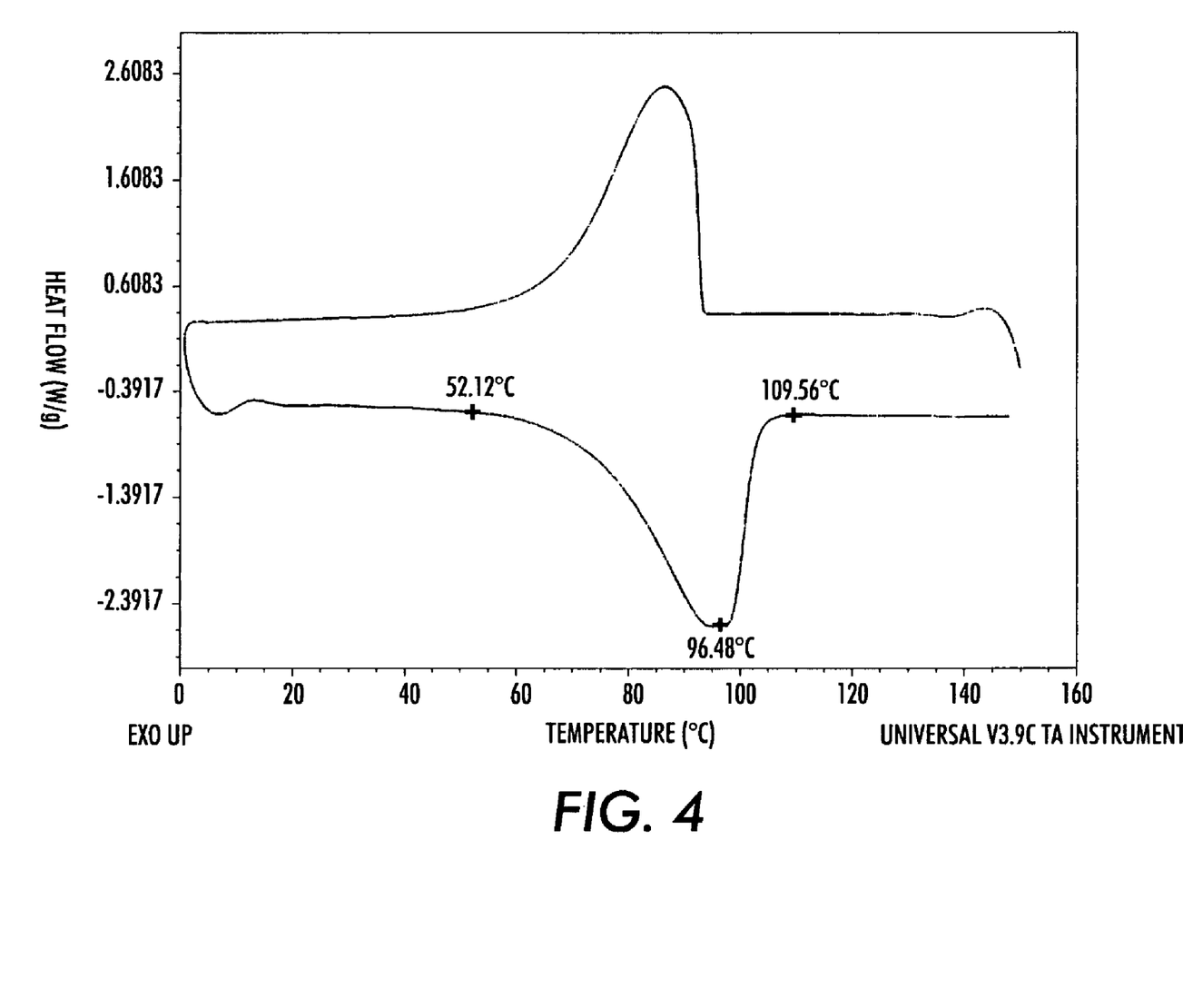
FIG. 4 shows a DSC Analysis for POLYWAX 655, a commercial wax available from Baker-Petrolite Corp.

Fractionated POLYWAX 1000 and virgin POLYWAX 655 were also tested. FIGS. 3 and 4 compare the DSC traces for the first portion extracted from POLYWAX 1000 and the DSC trace for POLYWAX 655. The DSC traces reflect the Mw distribution for the polyalkylenes. As shown in FIG. 3, the melting process for the first portion extracted from POLYWAX 1000, the melting process initiates at about 65° C. and completes at about 105° C. The peak temperature, which reflects the melting point, is 97° C. and is very close to that of POLYWAX 655 (which is around 96° C.). The melting characteristic for the first portion, which is the difference between the temperature at which the melting process ends and the temperature at which it begins, is relatively narrow and around 40° C. POLYWAX 655, on the other hand, exhibits a broad melting characteristic of about 57° C. as evidenced by the DSC trace which shows that the melting process begins at about 52° C. and ends at about 109.5° C.

Example 3

High Temperature GPC (HT-GPC) Results

Table 1 shows molecular weight characteristics that were measured for three wax samples using a high temperature GPC technique. Table 1 indicates that the fractionated POLYWAX 2000 has a higher molecular weight and narrower polydispersity than the unfractionated material. Also, analysis of the residue shows that low molecular weight impurities are being removed from the POLYWAX.

TABLE 1

HTGPC Analysis of POLYWAX samples

| Samples Description | Mn | Mw | PDI |
|---|---|---|---|
| Starting POLYWAX 2000 | 1890 | 2746 (Mw) | 1.45 |
| Fractionated POLYWAX 2000 (the 2$^{nd}$ portion) | 2694 | 3418 (Mw$_2$) | 1.27 (PDI$_2$) |
| Residue removed from POLYWAX 2000 by extraction process (the 1$^{st}$ portion) | 1557 | 1999 (Mw$_1$) | 1.28 (PDI$_1$) |
| Starting POLYWAX 1000 | 1154 | 1243 (Mw) | 1.08 |
| Fractionated POLYWAX 1000 (the 2$^{nd}$ portion) | 1259 | 1325 (Mw$_2$) | 1.05 (PDI$_2$) |
| Residue removed from POLYWAX 1000 by extraction process (the 1$^{st}$ portion), PW 1000-F1 | 840 | 872 (Mw$_1$) | 1.04 (PDI$_1$) |

Example 4

HT-GPC Statistical Analysis

Figure 2:
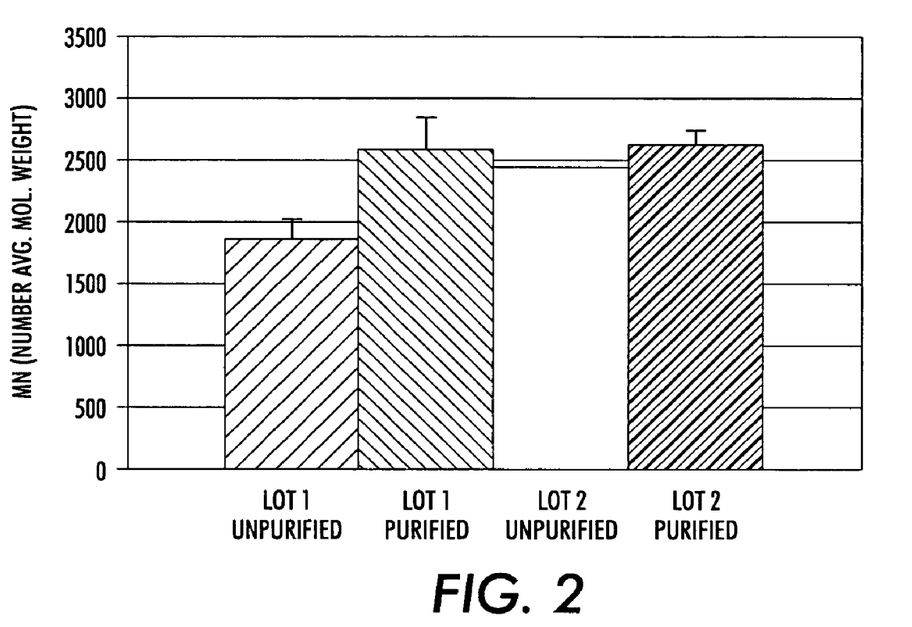
FIG. 2 shows the HT-GPC statistical analysis of several separated and unseparated polyalkylene samples according to one embodiment of the present disclosure.

FIG. 2 shows HT-GPC statistical analysis of several fractionated and unfractionated POLYWAX samples (95% confidence interval is indicated by error bars). The figure indicates that the fractionated material indeed has a consistently higher number average molecular weight than the unfractionated material. Also, the two different lots of unfractionated POLYWAX have significantly different Mn. The fractionalization process thus creates a more consistent supply of wax for processing into the final application.

Example 5

Phase Change Ink Compositions

Formulations for various ink compositions are suggested in Tables 3 & 4.

TABLE 3

Phase Change Inks with Black colorants

| | Ink I | Ink II | Ink III | Ink IV | Ink V | Ink VI |
|---|---|---|---|---|---|---|
| Resin A | 13.46 | 11.5 | 12.71 | 10.26 | 0 | 0 |
| Resin B | 0 | 0 | 0 | 0 | 14.08 | 12.89 |
| Nipex 150 | 0 | 2.5 | 0 | 2.4 | 0 | 2.7 |
| Special Black 4 | 2.5 | 0 | 3 | 0 | 3.52 | 0 |
| OLOA 11000 | 3.19 | 2.65 | 3.02 | 2.43 | 2.82 | 6.02 |
| Nauguard N445 | 0.22 | 0.28 | 0.22 | 0.12 | 0.18 | 0 |
| Kemamide S180 | 16.76 | 18.26 | 14.23 | 16.25 | 20.4 | 15 |
| KE100 | 8.38 | 11.35 | 7.81 | 11 | 10.47 | 9.04 |
| N445 | 0.2 | 0.2 | 0.1 | 0.1 | 0.1 | 0.18 |

TABLE 3-continued

Phase Change Inks with Black colorants

| | Ink I | Ink II | Ink III | Ink IV | Ink V | Ink VI |
|---|---|---|---|---|---|---|
| PW1000-F1 | 52.62 | 49.77 | 56.14 | 54.91 | 45.01 | 50.4 |
| Resin C | 2.87 | 3.69 | 2.87 | 2.53 | 3.52 | 3.77 |

Ink I uses Resin A, a triamide described in Example IV of U.S. Pat. No. 6,860,930.
Ink II uses Resin A, a triamide described in Example I of U.S. Pat. No. 6,860,930.
Ink III uses Resin A, a triamide described in Example III of U.S. Pat. No. 6,860,930.
Ink IV uses Resin A, a triamide described in Example II of U.S. Pat. No. 6,860,930.
Ink V uses Resin B, a tetra-amide described in Example I of U.S. Pat. No. 6,174,937 B1.
Ink VI uses Resin B, a tetra-amide described in Example I of U.S. Pat. No. 6,174,937 B1.
Nipex 150 is a carbon black from Degussa corp.
Special Black 4 is a carbon black from Degussa Corp.
OLOA 11000 is a dispersing aid from Chevron Corp.
Nauguard N445 is an antioxidant from Crompton Corp.
Kemamide S180 is a stearyl stearamide from Crompton Corp.
KE100 is a rosin ester from Arakawa Chemical USA.
PW1000-F1 is a polyethylene wax obtained by solvent fractionation, see Table 1.
Resin C is a urethane resin in Example IV of U.S. Pat. No. 6,309,453.

TABLE 4

Phase change ink with a colorant other than black

| Components | Composition % |
|---|---|
| Resin A or Resin B | 10-25 |
| Dispersing aid | 0-20 |
| Colorant | 1-5 |
| Kemamide S180 | 10-30 |
| Nauguard N445 | 0-1 |
| PW1000-F1 | 30-65 |
| Resin 12 | 0.5-9 |

Resin A is a triamide described in U.S. Pat. No. 6,860,930.
Resin B is a tetra-amide described in U.S. Pat. No. 6,174,937.
Nipex 150 is a carbon black from Degussa corp.
Colorants are pigment colorants.
OLOA 11000 is a dispersing aid from Chevron Corp.
Nauguard N445 is an antioxidant from Crompton Corp.
Kemamide S180 is a stearyl stearamide from Crompton Corp.
KE100 is a rosin ester from Arakawa Chemical USA.
PW1000-F1 is a polyethylene wax obtained by solvent fractionation, see Table 1.
Resin C is a urethane resin in Example IV of U.S. Pat. No. 6,309,453.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A phase change ink comprising:
   a colorant; and
   a polyalkylene wax fraction obtained by extracting the polyalkylene wax fraction from a starting polyalkylene with an acyclic branched or unbranched hydrocarbons having the general formula $C_nH_{2n+2}$, in which n is the number of atoms and is from about 1 to about 30 and recovering the polyalkylene wax fraction, the polyalkylene wax fraction having a polydispersity of approaching 1 to about 1.30;
   wherein the polyalkylene wax fraction has a melting characteristic of about 40° C. or less and a weight average molecular weight of from 870 to 2000.

2. The polyalkylene wax fraction according to claim 1, wherein the first portion has a polydispersity of approaching 1 to about 1.07.

3. The polyalkylene wax fraction according to claim 1, wherein the first portion has a polydispersity of approaching 1 to about 1.05.

4. The phase change ink according to claim 1, wherein the polyalkylene wax fraction comprises hydrocarbon fractions of from about 0 to about 50 carbons.

5. A phase change ink comprising:
a colorant; and
a carrier comprising a first polyalkylene wax portion separated from a starting polyalkylene wax, the polyalkylene wax portion being separated from the starting polyalkylene wax by (i) combining the starting polyalkylene wax with a fluid comprising acyclic branched or unbranched hydrocarbons having the general formula $C_nH_{2n+2}$, in which n is the number of atoms and is from about 1 to about 30, (ii) dissolving the first polyalkylene wax portion in the fluid, and (iii) recovering the first polyalkylene wax portion from the fluid, wherein the first polyalkylene wax portion has a polydispersity index $PDI_1$ of approaching 1 to about 1.30;
wherein the first polyalkylene wax portion has a melting characteristic of about 40° C. or less and a weight average molecular weight of from 870 to 2000.

6. The phase change ink according to claim 5, wherein n is from about 4 to about 26.

7. The phase change ink according to claim 5, wherein the first portion is present in an amount from about 30 percent to about 65 percent by weight of the ink.

8. The phase change ink according to claim 5, wherein n is from about 5 to about 16.

9. The phase change ink according to claim 5, wherein mixing the starting polyalkylene wax with the fluid and dissolving the first polyalkylene wax portion are carried out a temperature of from about 60° C. to about 90° C.

10. The phase change ink according to claim 5, wherein the mixing of the starting polyalkylene wax with the fluid and dissolving the first polyalkylene wax portion are carried at a temperature of about 70° C.

* * * * *